(12) United States Patent
Li et al.

(10) Patent No.: US 10,110,104 B2
(45) Date of Patent: Oct. 23, 2018

(54) PERMANENT MANGET SYNCHRONOUS MOTOR

(71) Applicants: LinZhen Li, Shenzhen (CN); ZhuMing Chu, Shenzhen (CN)

(72) Inventors: LinZhen Li, Shenzhen (CN); ZhuMing Chu, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 176 days.

(21) Appl. No.: 15/417,213

(22) Filed: Jan. 26, 2017

(65) Prior Publication Data

US 2018/0115228 A1 Apr. 26, 2018

(30) Foreign Application Priority Data

Oct. 24, 2016 (CN) .......................... 2016 1 0949207

(51) Int. Cl.
| | |
|---|---|
| *H02K 1/00* | (2006.01) |
| *H02K 21/16* | (2006.01) |
| *H02K 1/14* | (2006.01) |
| *H02K 1/27* | (2006.01) |
| *H02K 3/18* | (2006.01) |
| *H02K 5/04* | (2006.01) |

(52) U.S. Cl.
CPC .............. *H02K 21/16* (2013.01); *H02K 1/148* (2013.01); *H02K 1/2706* (2013.01); *H02K 1/2753* (2013.01); *H02K 3/18* (2013.01); *H02K 5/04* (2013.01)

(58) Field of Classification Search
CPC ............ H02K 1/16; H02K 1/165; H02K 1/18; H02K 15/026

USPC ...... 310/216.001, 216.009, 216.024–216.39, 310/216.051, 216.086, 216.109
See application file for complete search history.

(56) References Cited

U.S. PATENT DOCUMENTS

| | | | | |
|---|---|---|---|---|
| 2001/0030483 A1* | 10/2001 | Masumoto | ............. | H02K 1/165 310/216.008 |
| 2006/0279160 A1* | 12/2006 | Yoshinaga | ............. | H02K 1/148 310/216.011 |
| 2009/0134739 A1* | 5/2009 | Akita | ..................... | H02K 1/148 310/216.004 |
| 2011/0169367 A1* | 7/2011 | Bourqui | ................. | H02K 1/148 310/216.009 |
| 2013/0119790 A1* | 5/2013 | Gan | ....................... | H02K 1/276 310/50 |
| 2015/0280535 A1* | 10/2015 | Yang | ..................... | H02K 1/165 310/156.38 |

* cited by examiner

*Primary Examiner* — Thanh Lam
(74) *Attorney, Agent, or Firm* — Na Xu; IPro, PLLC

(57) ABSTRACT

A permanent magnet synchronous motor is provided in the present disclosure. The permanent magnet synchronous motor includes a housing as well as a stator and a rotor received in the housing, the stator surrounding the rotor, wherein the stator comprises a core which surrounds the rotor and is annular and a plurality of coils wound on the core, the plurality of coils are disposed at intervals and distributed in an annular array, the core is composed of a plurality of core blocks spliced with each other, the core block comprises a raised part on the outer wall, and grooves matched with the raised parts in shape and used for positioning the raised parts are formed in the inner wall of the housing.

11 Claims, 5 Drawing Sheets

PERMANENT MANGET SYNCHRONOUS MOTOR

FIELD OF THE DISCLOSURE

The present disclosure generally relates to motor, and more particularly to, a permanent magnet synchronous motor.

BACKGROUND

In relevant technologies, a stator of a permanent magnet synchronous motor generally includes a core for magnetic conduction and a coil winding for electric conduction; on the one hand, the core is of an integral structure and is provided with a tooth socket for embedding the coil winding on the inner wall, so that the core is inconvenient to machine, the output torque fluctuates, and high-precision control of speed and position is thus influenced; and on the other hand, no positioning structure is provided for the core and a housing, so that when a rotor rotates, the relative positions of the core and the rotor easily deviate, as a result, the output parameter of the permanent magnet synchronous motor is instable, and the reliability is low.

In the permanent magnet synchronous motor provided by the present disclosure, the stator core is disposed in the form of a plurality of core blocks spliced with each other, so that the core is convenient to machine; compared with the traditional stator core, the core of the present disclosure is not provided with a tooth socket for embedding coils, so that the torque is output without fluctuating, and high-precision control of speed and position can be realized; meanwhile, the core blocks are provided with raised parts, and grooves matched with and pressing against the raised parts are formed in the inner wall of the housing to realize positioning and fixation of the core, so that the position of the core is unlikely to deviate, and the output parameter of the permanent magnet synchronous motor is stable.

Therefore, it is desired to provide a permanent magnet synchronous motor and assembly method thereof to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
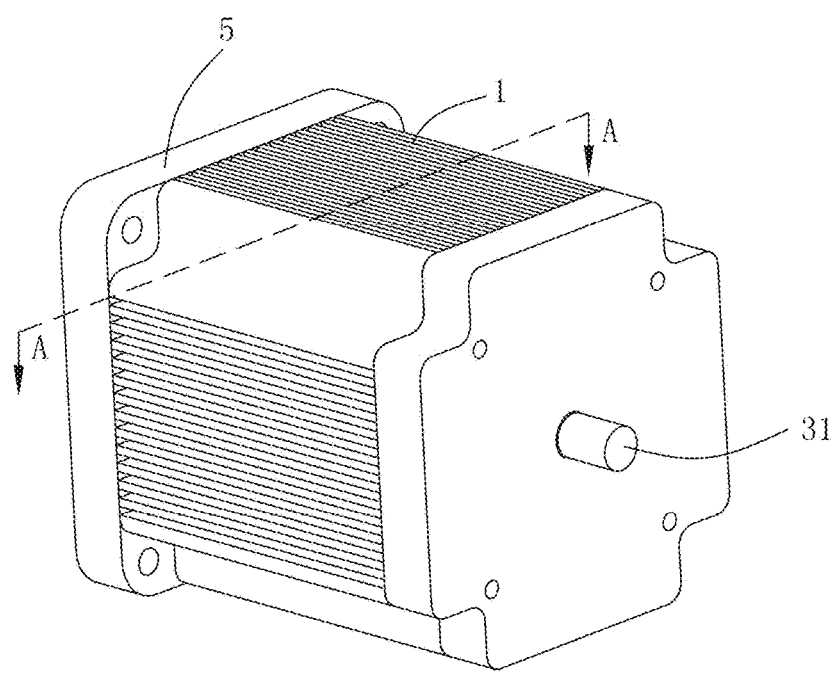
FIG. 1 is a three-dimensional structural diagram of a permanent magnet synchronous motor of the present disclosure.
Figure 2:
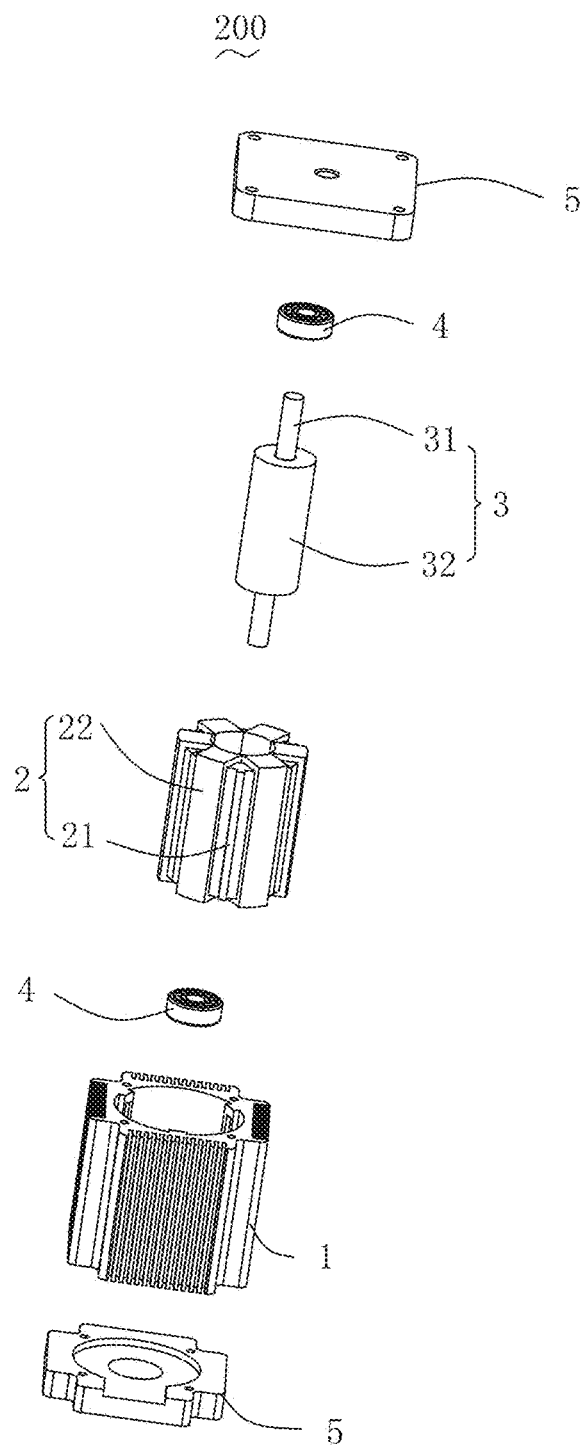
FIG. 2 is an exploded view of the permanent magnet synchronous motor shown in FIG. 1.

Reference is made to FIG. 1 and FIG. 2 simultaneously. A permanent magnet synchronous motor 200 includes a housing 1 with a receiving space, a stator 2 and a rotor 3 received in the housing 1, bearings 4 and brackets 5 for installing the bearings 4 and supporting the rotor 3 to rotate.

Figure 3:
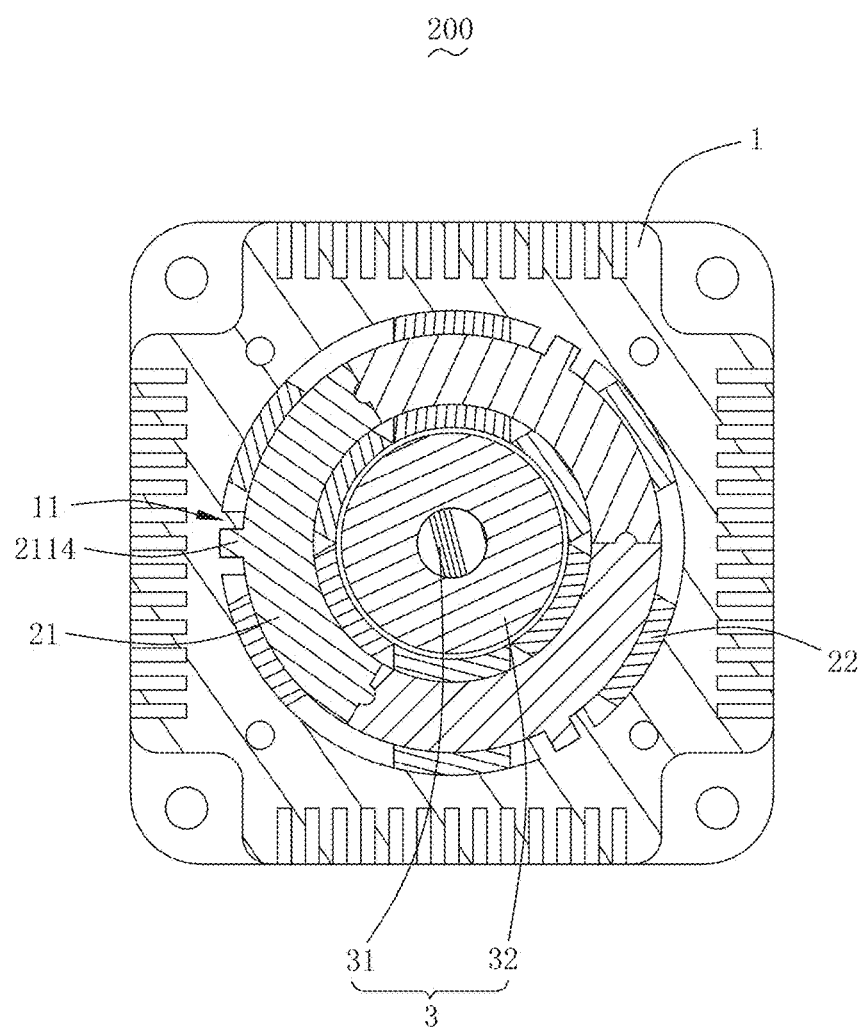
FIG. 3 is a cross-sectional view along an A-A line in FIG. 1.

Referring to FIG. 3, grooves 11 are formed in the inner wall of the housing 1, and the grooves 11 are used for positioning the stator 2. The clearance between the housing 1 and the stator 2 is filled with a thermal conductive polymeric material (not shown in the figure). In this embodiment, the thermal conductive polymeric material is thermal conductive silicone grease, and the thermal conductive polymeric material is disposed to strengthen the insulating effect and the heat dissipation effect of the housing 1 of the permanent magnet synchronous motor 200.

Figure 4:
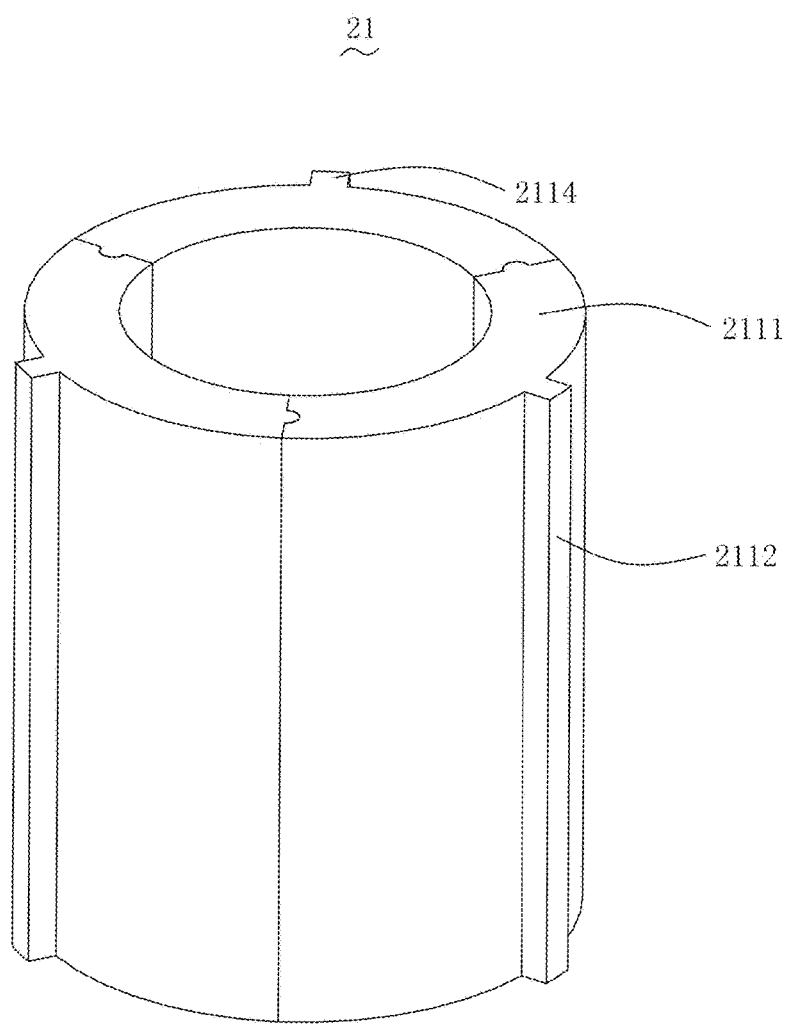
FIG. 4 is a three-dimensional structural diagram of a core of the permanent magnet synchronous motor shown in FIG. 2.
Figure 5:
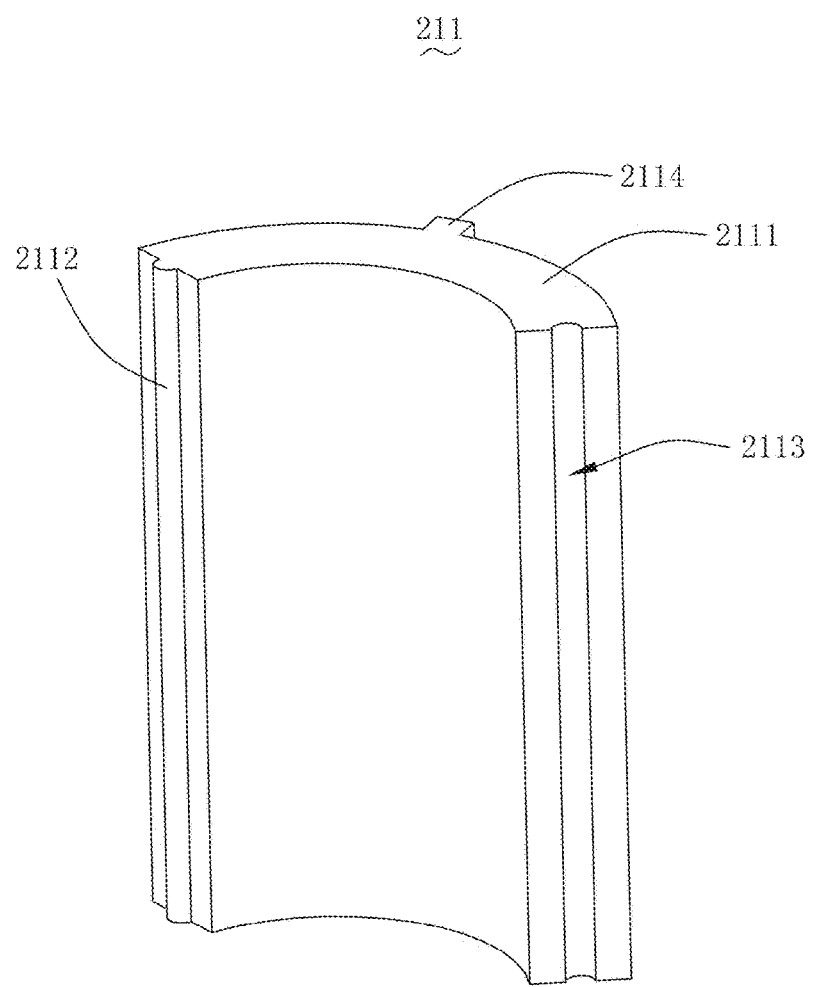
FIG. 5 is an assembly diagram of the cores of the permanent magnet synchronous motor shown in FIG. 4.

Referring to FIG. 4 and FIG. 5, the stator 2 includes a core 21 surrounding the rotor 3 and disposed annularly and a plurality of coils 22 wound on the core 21.

The core 21 is composed of a plurality of core blocks 211 spliced with each other, the core 21 is a hollow cylinder and has a circular cross section, the inner wall of the core 21 is smooth, and no tooth sockets for embedding the coils 22 are formed in the inner wall and the outer wall of the core 21 over the traditional stator core structure, so that the magnetic induction intensity of the air gap is completely in sinusoidal distribution, the torque is output without fluctuating, and high-precision control of speed and position can be realized.

The plurality of coils 22 are wound on the inner wall and the outer wall of the core blocks 211 in the axial direction of the core 21. The axial direction of the core 21 is same as the length direction of a rotating shaft 31 of the rotor 3, and each coil 22 wraps part of the inner wall and the outer wall of the core block 211.

The core block 211 includes a block body 2111, an extended part 2112 extended from one side of the block body 2111, a yielding part 2113 located on the other side of the block body 2111 and matched with the extended part 2112, and a raised part 2114 disposed on the outer wall of the block body 2111. In this embodiment, there are three core blocks 211.

The block body 2111 is in the shape of an arc block, and the three core blocks 211 form the core 21 and enable the core 21 to be a hollow cylinder.

The extended parts 2112 are distributed in the axial direction of the core 21, the two adjacent core blocks 211 are matched and clamped with each other via the extended parts 2112 and the yielding parts 2113, and the core 21 spliced by the core blocks 211 is convenient to machine.

The raised parts 2114 are distributed in the axial direction of the core 21, and are disposed at equal intervals. Specifically, each core block 211 is provided with a raised part 2114. The raised parts 2114 are matched with and press against the grooves 11 to realize positioning, the core 21 spliced by the core blocks 211 is thus positioned and fixed with the housing 1, and when the rotor 3 rotates, the core 21 is fixed firmly, so that the output parameter of the permanent magnet synchronous motor 200 is stable and the reliability is high.

The plurality of coils 22 are disposed at intervals and distributed in an annular array. The plurality of coils 22 are disposed at equal intervals, and each core block 211 is wound with two coils 22. The quantity of the coils 22 is a multiple of six, there are six coils 22 in this embodiment, and of course, the quantity of the coils 22 may also be twelve, eighteen and the like. Three-phase current is connected to every three coils 22, and the current direction of each coil 22 is changed according to the time of sinusoidal signals.

The rotor 3 includes a rotating shaft 31 and a magnet 32 sleeved on the rotating shaft 31, the core 21 surrounds the magnet 32, and the rotating shaft 31 is matched and connected with the bearings 4. There are two brackets 5, which are respectively fixed at two ends of the housing 1.

Compared with the relevant technologies, the permanent magnet synchronous motor of the present disclosure has the advantages that the stator core is disposed in the form of a plurality of core blocks spliced with each other, so that the core is convenient to machine; compared with the traditional stator core, the core of the present disclosure is not provided with a tooth socket for embedding the coils, so that the torque is output without fluctuating, and high-precision control of speed and position can be realized; meanwhile, the core blocks are provided with raised parts, and grooves matched with and pressing against the raised parts are formed in the inner wall of the housing to realize positioning and fixation of the core, so that the position of the core is unlikely to deviate, and the output parameter of the permanent magnet synchronous motor is stable.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A permanent magnet synchronous motor, comprising:
a housing;
a stator; and
a rotor;
wherein the stator and the rotor is received in the housing, the stator surrounding the rotor, the stator comprises a core which surrounds the rotor and is annular and a plurality of coils wound on the core, the plurality of coils are disposed at intervals and distributed in an annular array, the core is composed of a plurality of core blocks spliced with each other, the core block comprises a raised part on the outer wall, and grooves matched with the raised parts in shape and used for positioning the raised parts are formed in the inner wall of the housing.

2. The permanent magnet synchronous motor as described in claim 1, wherein the two adjacent core blocks are matched and clamped with each other via extended parts and yielding parts nested with each other.

3. The permanent magnet synchronous motor as described in claim 2, wherein block bodies are in the shape of arc blocks, and the cross section of the core is annular.

4. The permanent magnet synchronous motor as described in claim 1, wherein the quantity of the core blocks is three, and each core block is provided with a raised part on the outer wall.

5. The permanent magnet synchronous motor as described in claim 4, wherein the raised parts and the grooves are distributed in the axial direction of the core, and the raised parts are disposed at equal intervals.

6. The permanent magnet synchronous motor as described in claim 1, wherein the plurality of coils are disposed at equal intervals, and each core block is wound with two coils.

7. The permanent magnet synchronous motor as described in claim 1, wherein the quantity of the coils is a multiple of six.

8. The permanent magnet synchronous motor as described in claim 7, wherein the quantity of the coils is six.

9. The permanent magnet synchronous motor as described in claim 1, wherein the clearance between the housing and the core is filled with a thermal conductive polymeric material.

10. The permanent magnet synchronous motor as described in claim 9, wherein the thermal conductive polymeric material is thermal conductive silicone grease.

11. The permanent magnet synchronous motor as described in claim 1, wherein the surface of the core is smooth.

* * * * *